Patented Jan. 1, 1924.

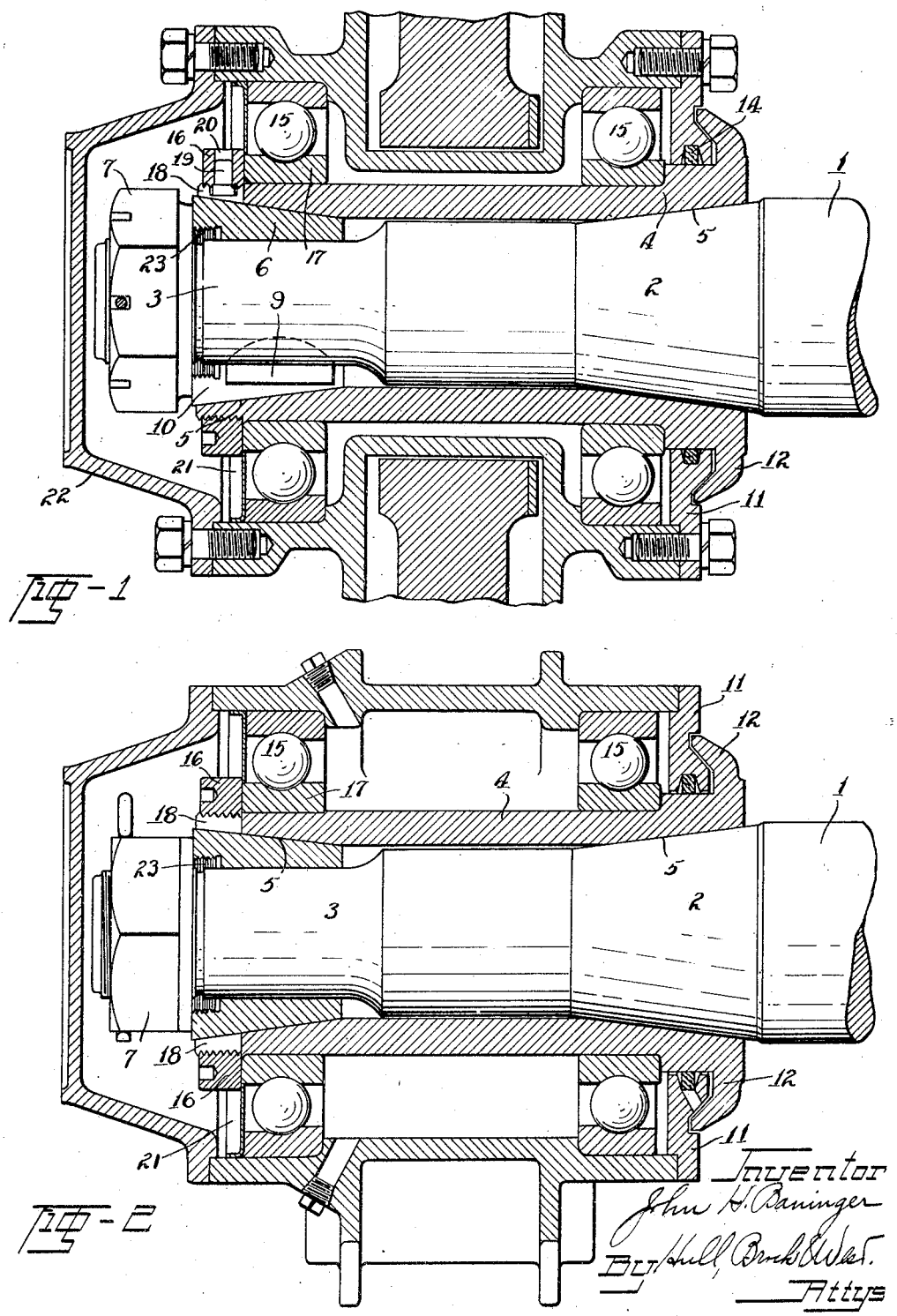

1,479,445

UNITED STATES PATENT OFFICE.

JOHN H. BANINGER, OF JAMESTOWN, NEW YORK.

BEARING BOX.

Application filed January 26, 1922. Serial No. 532,023.

*To all whom it may concern:*

Be it known that I, JOHN H. BANINGER, a citizen of the United States, residing at Jamestown, in the county of Chautauqua and State of New York, have invented a certain new and useful Improvement in Bearing Boxes, of which the following is a full, clear, and exact description, reference being had to the accompanying drawings.

This invention relates to bearing boxes and has particular reference to a bearing box designed to withstand heavy loads and severe shocks such as are encountered in railway use.

Some of the objects of the present invention are to provide an antifriction bearing box which may be easily assembled or removed as a unit from the axle or shaft on which it is mounted; to provide a bearing box in which, the rolling bearings remain completely enclosed during the assembly or removal of the box from the shaft or axle, thus preventing foreign matter from penetrating to the bearing surfaces; to provide a bearing box which shall include means for adjusting the bearings therein to take up wear; to provide a bearing box which shall consist of few parts which are simple in construction and inexpensive to manufacture, while further objects and advantages will appear as the description proceeds.

In the accompanying drawing, wherein I have shown one form of my invention, Figs. 1 and 2 are respectively transverse and vertical sectional views of a bearing box constructed in accordance with my invention.

Describing by reference characters, the various parts illustrated 1 indicates the shaft or axle upon which my bearing is mounted. The end of this axle is provided with a tapered portion 2 and a reduced outer end, indicated at 3. A bearing sleeve 4 having each end thereof taper bored as indicated at 5 is fitted on the end of the axle so that one of said tapered bores is seated on the tapered portion 2 of the axle and the other of said tapered bores is engaged by a tapered adapter sleeve 6 interposed between sleeve 4 and the reduced end 3 of the axle. A nut 7 threaded on the outer end of the axle retains the adapter sleeve in adjusted position and in order to prevent torsional pressure being transmitted therebetween, I preferably secure the adapter sleeve to the axle by a key indicated at 9 which is inserted in a slot 10 formed in said sleeve.

The inner end of bearing sleeve 4 projects through the inner bearing box cover plate 11 and is cup flanged as indicated at 12 to exclude dirt or other foreign matter from the bearing box. A ring of packing material 14 is also interposed between cover plate 11 and the sleeve to insure the exclusion of foreign matter and the retention of lubricant within the box.

Mounted on the bearing sleeve 4 in spaced relation are the bearing elements 15, 15 which are adjustable to take up wear by means of a spanner nut 16 threaded on the outer end of sleeve 4 and engaging the inner race 17 of one of said elements. The outer end of sleeve 4 is provided with a plurality of slots 18 so that the spanner nut 16 may be locked in adjusted position by inserting the head of a pin 19 into one of said slots and engaging the stem of said pin in an aperture 20 in the spanner nut as clearly shown in Fig. 1.

A dust ring 21 is fitted between the housing of the bearing box and the spanner nut 16 so that when the bearing box outer cover plate 22 is removed, dirt and other foreign matter is prevented from entering the bearing surfaces.

When it is desired to remove the bearing box, the outer cover plate 22 is first removed to gain access to nut 7 and adapter sleeve 6. Nut 7 is removed in the usual manner whereupon the adapter sleeve may be withdrawn, using a special tool engaged in the threaded aperture 23 in said sleeve if necessary. When these parts are removed the bearing box may be withdrawn as a unit from the axle end without disturbing the bearing elements. The dust ring 21 and rear cover plate 10 prevent dirt and other foreign material from entering the bearing box while removed from the axle.

Having thus described my invention, what I claim is:

1. In a bearing box of the character set forth, the combination with a shaft having a tapered seat thereon, of a bearing sleeve detachably mounted on said shaft and having a tapered bore at each end thereof, one of said bores being adapted to engage said tapered seat, a tapered sleeve mounted on said shaft and engaged with the other of said tapered bores, said sleeve being adapted to secure said bearing sleeve to said shaft against rotation, bearing elements carried by said bearing sleeve, and a box rotatably mounted on said bearing elements.

2. In a bearing box of the character set forth, the combination with a shaft having a tapered seat thereon, of a bearing sleeve detachably mounted on said shaft and having a tapered bore at each end thereof, one of said bores being adapted to engage said tapered seat, a tapered sleeve mounted on said shaft and engaged with the other of said tapered bores, said tapered sleeve being adapted to secure said bearing sleeve to said shaft against rotation, means carried by said tapered sleeve to facilitate the removal thereof from said tapered bore, bearing elements carried by said bearing sleeve, and a box rotatably mounted on said bearing elements.

3. In a bearing box of the character set forth, the combination with a shaft having a tapered seat and a reduced outer end, of a bearing sleeve mounted on said shaft and having a tapered bore at each end thereof, one of said bores being adapted to engage said tapered seat, a removable tapered sleeve mounted on the reduced outer end of said shaft and engaged with the other of said tapered bores, and bearing elements carried by said bearing sleeve, said bearing sleeve being projected through one end of the bearing box and provided with a flange arranged in close relationship to the bearing box to exclude foreign matter from said box.

4. In a bearing box of the character set forth, the combination with a shaft having a tapered seat and a reduced outer end, of a bearing sleeve mounted on said shaft and having a tapered bore at each end thereof, the bore in one end of said sleeve being adapted to engage said tapered seat, a tapered sleeve interposed between the reduced outer end of said shaft and the other taper bore in said sleeve for securing said bearing sleeve to said shaft, bearing elements carried by said bearing sleeve, and means enclosing said bearing elements within the bearing box, said bearing elements and sleeve being removable from said shaft as a unit.

5. In a bearing box of the character set forth, the combination with a shaft having a tapered seat and a reduced outer end, of a bearing sleeve mounted on said shaft and having a tapered bore at each end thereof, one of said bores being adapted to engage said tapered seat, a removable tapered sleeve mounted on the reduced outer end of said shaft and engaged with the other of said tapered bores, anti-friction bearing elements carried by said bearing sleeve, and means for adjusting said bearing elements.

6. In a bearing box of the character set forth, the combination with a shaft having a tapered seat and a reduced outer end, of a bearing sleeve mounted on said shaft and having a tapered bore at each end thereof, one of said bores being adapted to engage said tapered seat, a removable tapered sleeve mounted on the reduced outer end of said shaft and engaged with the other of said tapered bores, anti-friction bearing elements carried by said bearing sleeve, and means for adjusting and locking said tapered sleeve and bearing sleeve on said shaft.

7. In a bearing box of the character set forth, the combination with a shaft, of a bearing sleeve removably secured to said shaft, anti-friction bearing elements carried by said sleeve, and means carried by said sleeve and abutting said bearing elements for adjusting said elements.

8. In a bearing box of the character set forth, the combination with a shaft having a tapered seat and a reduced outer end, of a bearing sleeve mounted on said shaft and having a tapered bore at each end thereof, one of said bores being adapted to engage said tapered seat, a removable tapered sleeve mounted on the reduced outer end of said shaft and engaged with the other of said tapered bores, anti-friction bearing elements carried by said bearing sleeve, and a member threaded and locked on said bearing sleeve and abutting said bearing elements.

9. In a bearing box of the character set forth, the combination with a shaft having a tapered seat and a reduced outer end, of a bearing sleeve mounted on said shaft and having a tapered bore at each end thereof, one of said bores being adapted to engage said tapered seat, a removable tapered sleeve mounted on the reduced outer end of said shaft and engaged with the other of said tapered bores, anti-friction bearing elements carried by said bearing sleeve, a member threaded on said bearing sleeve and abutting said bearing elements, and means for locking said member to said bearing sleeve.

In testimony whereof, I hereunto affix my signature.

JOHN H. BANINGER.